(12) United States Patent
Rodewald et al.

(10) Patent No.: US 7,924,994 B2
(45) Date of Patent: Apr. 12, 2011

(54) METHOD OF OPERATING AND CONFIGURING A TELECOMMUNICATION SYSTEM; DISPATCHER SOFTWARE FOR IDENTIFYING A CLIENT THEREIN AND TELECOMMUNICATION APPARATUS CONTAINING SAME

(75) Inventors: Frank Rodewald, Bedburg (DE); Hermann Rauth, Oberhausen (DE); Udo Kayser, Wuppertal (DE)

(73) Assignee: Tenovis GmbH & Co. KG, Frankfurt am Main (DE)

( * ) Notice: Subject to any disclaimer, the term of this patent is extended or adjusted under 35 U.S.C. 154(b) by 1006 days.

(21) Appl. No.: 11/083,075

(22) Filed: Mar. 16, 2005

(65) Prior Publication Data

US 2005/0243720 A1 Nov. 3, 2005

(30) Foreign Application Priority Data

Mar. 17, 2004 (DE) .................. 10 2004 013 392

(51) Int. Cl.
 *H04M 1/56* (2006.01)
 *H04M 7/00* (2006.01)
(52) U.S. Cl. ................ 379/142.03; 379/220.01
(58) Field of Classification Search ............ 379/221.15, 379/220.01, 265.01, 266.1, 142.01–142.05
See application file for complete search history.

(56) References Cited

U.S. PATENT DOCUMENTS

| | | | | |
|---|---|---|---|---|
| 5,361,299 A * | 11/1994 | Izumi | ............................ | 379/252 |
| 5,422,941 A * | 6/1995 | Hasenauer et al. | ............ | 379/246 |
| 5,475,744 A * | 12/1995 | Ikeda | ........................ | 379/127.01 |
| 5,539,817 A * | 7/1996 | Wilkes | ............................ | 379/230 |
| 5,673,310 A * | 9/1997 | Andruska et al. | ............. | 379/230 |
| 5,787,355 A * | 7/1998 | Bannister et al. | ............. | 455/458 |
| 5,812,655 A * | 9/1998 | Pickeral et al. | ........... | 379/221.14 |
| 5,995,613 A * | 11/1999 | Goel et al. | ............... | 379/221.15 |
| 6,012,821 A | 1/2000 | Yeaney et al. | | |
| 6,328,458 B1 | 12/2001 | Bell et al. | | |
| 6,625,178 B1 * | 9/2003 | Okumura et al. | ............. | 370/524 |
| 6,639,789 B2 | 10/2003 | Beger | | |
| 6,665,394 B1 * | 12/2003 | Nishimoto et al. | ...... | 379/221.15 |
| 6,707,897 B2 * | 3/2004 | Nishida | ........................ | 379/188 |
| 6,731,739 B2 * | 5/2004 | Riihinen et al. | ......... | 379/221.01 |
| 6,732,988 B2 | 5/2004 | Ihalainen et al. | | |
| 6,778,656 B1 * | 8/2004 | Stevens et al. | ........... | 379/221.01 |
| 6,793,625 B2 | 9/2004 | Cavallaro et al. | | |
| 6,817,585 B2 | 11/2004 | Wagner et al. | | |
| 6,840,486 B2 | 1/2005 | Kuhn | | |

(Continued)

FOREIGN PATENT DOCUMENTS

DE 9218373.5 12/1992

(Continued)

OTHER PUBLICATIONS

"German Office Action", Mar. 17, 2004.

*Primary Examiner* — Gerald Gauthier
*Assistant Examiner* — Mohammad Islam
(74) *Attorney, Agent, or Firm* — Andrew Wilford

(57) ABSTRACT

A telecommunications system has a plurality of mutually independent clients each having a plurality of terminal devices connecting to the telecommunication system and provided in groups. A client specific identification KID and a group specific identification ZID are assigned. A dispatcher number storage can serve to assign the KID and ZID from an E.164 incoming call for routing purposes and to determine whether calls will be executed internally or externally.

12 Claims, 3 Drawing Sheets

U.S. PATENT DOCUMENTS

| | | |
|---|---|---|
| 6,857,609 B2 | 2/2005 | Stoianovici et al. |
| 6,896,233 B2 | 5/2005 | Kuhn |
| 6,947,542 B2 * | 9/2005 | Stumer et al. ............ 379/221.14 |
| 2003/0012345 A1 * | 1/2003 | Marsh et al. ................. 379/67.1 |
| 2004/0188578 A1 | 9/2004 | Turner |

FOREIGN PATENT DOCUMENTS

| | | |
|---|---|---|
| DE | 19807241 | 2/1998 |
| DE | 19807242 | 2/1998 |
| DE | 19807243 | 2/1998 |
| EP | 0876799 | 11/1998 |
| EP | 1 128 680 | 8/2001 |
| WO | 01/76270 | 10/2001 |

* cited by examiner

METHOD OF OPERATING AND CONFIGURING A TELECOMMUNICATION SYSTEM; DISPATCHER SOFTWARE FOR IDENTIFYING A CLIENT THEREIN AND TELECOMMUNICATION APPARATUS CONTAINING SAME

FIELD OF THE INVENTION

Our present invention relates to a method of operating and configuring a telecommunication system, to dispatcher software for identifying a client in a telephone system, and to a telecommunications apparatus containing the dispatcher software and whereby a plurality of clients each having a plurality of terminal devices can communicate independently of one another, i.e. utilize the exchange independently of one another. Where the telecommunication system is a private network, the exchange or telecommunications apparatus referred to is the central apparatus or exchange of that network which can communicate in turn with public networks or open nets as will be described.

BACKGROUND OF THE INVENTION

Telephone apparatus generally can be connected to subscribers and terminal devices. Large private telecommunications installations may reach in excess of 1000 subscribers. If these telecommunications installations are networked, for example through QSIG, communications systems can result in numbers of subscribers which are only limited by the maximum permissible length of the calling number used to indicate the subscriber or the device which is calling or to be called.

Telecommunications installations of this magnitude not only require a broad spectrum communications path, but employ features which are not obtainable with smaller telecommunication systems and can, for example, also allow server based applications like CTI (Computer Telephony Integration), CRM (Customer Relations Management) and Call Center Technology.

The performance features of telephone installations are capable of implementation at different costs. Complex communications technologies and server based applications are relatively expensive to provide because of the capital cost and thus are often uneconomical for small numbers of communications. Features which require advanced technology thus cannot be provided in small telephone installations. Features of that type however may be available for larger telecommunication installations with many clients which each may have many substantial groups, in which case the cost of any performance feature per subscriber may lie in a more economical range.

Two known approaches of this type is Centrex service utilizing a public network of Deutschen Telekom AG in Germany and the "multicompany" approach provided by private telecommunications suppliers. The Centrex service can provide private telephone installations connected to the open net centrally for many clients. The service uses both characteristics of private telephone systems and characteristics of the open net. The network intelligence, i.e. the control for the features, takes place through the open net and the interface between the open net and the private network is a virtual location with the function of a gateway between the nets.

The multicompany approach is based upon private network principles and uses telephone installations at each individual location. In a large apparatus, the communication system of the building or the plant is operated through a network driver of the type supplied by AVAYA TENOVIS or by Regus Corporation, U.K. The network intelligence is located in the primary network on the campus and the transition to the open network Os likewise a campus. The private network can include a plurality of private telephone installations.

A number of legally distinct and independent clients or customers can be provided for each telephone installation. An administrator operates the network driver of the installations and implements the performance features selected by the client and makes available the communication for the subscribers of the company. The private telephone installations known in the art are not designed for such applications and it has not been possible heretofore to provide simultaneously and individually all possible combinations of performance features for all of the individual customers or clients. As a consequence, the operator of campus networks generally provides packages of performance features which can be simultaneously applied.

In one existing system, the number of firms serviced is limited to 64 and the telephone apparatus cannot recognize the firms or customers or clients. The result is a limitation in the handling of communications with clients, substituting the formation of traffic groups for a client recognition.

It is common to refer to the "client" and "customer" in connection with the supply of telephone services and to refer to such parties each as having a number of subscribers, each of which represents a terminal device. The term "subscriber" is used to represent the terminal device as well and the subscriber identification number is likewise that of the device. With the aid of call number plans the relationship between subscriber lines to the terminal device and the internal call number of the subscriber can be established.

It is also known to provide a telecommunication system with an exchange which can include a telecommunication apparatus or installation. The exchange is usually capable, through digital communications, to connect that apparatus to other telecommunication apparatuses each with their respective central or exchange. For convenience, the term "central" may be used herein to refer to the telephone connection apparatus to which the subscriber lines are connected in a particular local system and that apparatus may also be referred to as the central. The communications protocol used may be either a standardized protocol (QSIG, DPNSS1) or a proprietary protocol (TNET, CORNET, . . . ). Telecommunication apparatus in an exchange can have devices which can charge for the use of the line per connection, and for connection duration. The art also is aware of an exchange of private telecommunication apparatus all of which are associated with a particular client.

Conventional systems which are customer based and are in the field of private communication apparatuses have been limited in many cases by the fact that the particular telecommunication apparatus is limited to a single customer or client. While it is true that the apparatus can be connected via an exchange with other telecommunications apparatus, in general in the past such private telecommunication apparatuses have not been capable of serving large numbers of clients and subscribers or terminal devices of a number of clients could not be conveniently accessed through many private telecommunication apparatuses. This is especially disadvantageous because communications between terminal devices of the same client are treated differently in connections between terminal devices of different clients. Many firms have geographically widely distributed subsidiaries or enterprise that in the past have been treated as different clients and may have calling number plans which may overlap in assignment of numbers. As a consequence, communication between them has been complicated in a private telephone system.

Private telephone systems by comparison to communications over open networks, may have a calling number plan in which calling numbers internal to the apparatus are assigned to the respective terminal devices. Such calling number plans are apparatus specific and thus the internal calling number is in general limited to that apparatus. It is possible to coordinate the calling number plans of a plurality of apparatuses with the drawback that with increasing number of subscribers in a coordinated system usually more digits are required to indicate each terminal device than would otherwise be required. Usually these calling number plans do not provide any recognition of the particular apparatus or its access line.

A client calling number plan of a customer based telecommunication apparatus must generally be capable of extending beyond a particular geographic region even though each particular region may be associated with a region code. In the case of a private communication system this can be a drawback when a client already has separate telecommunication apparatuses at different locations and each location has its own calling number plan. For that particular client it is not uncommon that at various locations the same calling number will be used. If these locations are to be connected to a central, the calling number plans must be revised so that the terminal devices again become singularly determined by their internal calling numbers.

OBJECTS OF THE INVENTION

It is therefore the principal object of the present invention to provide an improved customer based telecommunications system with private telecommunication apparatus capable of covering in range numerous geographic areas and widely distributed subscribers with a system wide singular client calling number plan.

Another object of the invention is to provide an improved method of configuring a telecommunication system for this purpose. Still another is to provide an improved method of operating a telecommunication system, a telecommunication system operated by that method and dispatches software for use in the telecommunication apparatus.

SUMMARY OF THE INVENTION

A customer oriented telecommunication apparatus, in accordance with the invention serves a multiplicity of clients, each of which can have a multiplicity of terminal devices which can be used independently from one another. The terminal devices of each client are grouped and all terminal devices of a group are characterized by a common singular access identification. Thus the respective groups of terminal devices of a client, either of an individual enterprise and/or an organizational unit, or where the client itself corresponds to a service provider and the groups of terminal devices correspond to the client of the service provider, has its own access identification. The telecommunications apparatus can decree, via means for storing client identification numbers, such client identification numbers for each client and respective access identification numbers for all terminal device groups.

The client identification number and the access identification number are determined from the E.164 call number of the called terminal device or from the evaluation-relevant parts thereof. This customer based extension apparatus has advantageously client-individual calling number plans which is one of a number of such plans each of which is individual to the terminal groups of that client and so that a particular extension number in this customer based telecommunication apparatus can be present for a number of terminal devices although for a maximum of one such terminal device of each client. Communications between terminal devices of different groups can extend beyond the client or completely within the particular apparatus, or over the open net or public communication systems.

The private communication system of the present invention thus can have a multiplicity of clients each with a multiplicity of terminal devices which can be used independently from one another. The private communications apparatus represented by a particular client identification number is a virtual private telecommunications apparatus or central, each of which contains the data assignment structure for that client. Such a virtual apparatus can be associated with each client or customer through the client identification number and can be organized differently from the organization of another client or customer and can even use different calling number plans for the subscribers of the different clients. Each client calling number plan can be in effect selected through the client identification number.

A communication system based upon a private telecommunication apparatus or central for an optional number of clients can have each client servicing an optional number of subscribers. Within the virtual apparatus of a client, performance features can be offered client wide to all of the subscribers of all of the groups thereof or individually for each of the subscribers. This can be achieved through an administrator for the client itself, for example allocation of subscriber rights, especially in conjunction with office traffic or through the use of those performance features. The handling and changing of specific data within the virtual apparatus, however, remains with the system administrator. This can include for example the configuring of traffic between virtual apparatuses of different clients and the selection and blocking of hardware apparatuses. In these private exchanges, each client is associated with the aforementioned client identification number and the client identification number defines the client individual virtual telephone apparatus.

The client identification number or KID is, therefore, an identification number which simply identifies the client and singularly identifies all of the terminal devices of a client and can provide an association between a terminal device and a client. A calling number is a sequence of digits which utilizes a specific calling number plan and with the aid of each internal calling number of this calling number plan can identify a terminal device. The calling number can be a public number or a private number. The public number usually includes a country code, a city code and an apparatus code. The private number can utilize level two code, level one code or local code. The public calling number has, to the extent that it contains all of these components, worldwide significance, the private calling number has significance only within a private telecommunication system and is defined by the operator.

An access identification code ZID is an identification number which is associated singularly with a calling number and singularly identifies a group of terminal devices. The combination of this access identification number with an internal call number makes this call number significant in the entire telecommunication net and in the public numbering plan worldwide. The access identification ZID is a part of the enlargement of the system wide calling number plan according to the invention. A particular location in this sense with a group of terminal devices will be identified by a common access call number. An enterprise is a group of terminal devices of a client with a common access call number. One can then refer to an enterprise of a particular client. An enterprise of a client can be singularly identified by the client identification number KID in combination with an access identification and thus access identifications themselves can represent different clients.

In the prior art, clients of a private telecommunications service will generally have a separate telecommunications apparatus for each enterprise. The above described telecommunications apparatus of the Applicant enables multiple clients each with at least a single access number and a client individual number plan to be joined in a single telecommunications apparatus.

According to the invention, the client-individual calling number plan is expanded by a multiple of internal calling numbers per client. A multiplicity of clients with a multiplicity of access call numbers and a multiplicity of calling number plans with access call numbers and client numbers individual thereto can be provided in a single telecommunication apparatus to enable the multiplication of internal numbers for each client.

The present invention provides an improvement in telecommunications with respect to subscribers beyond a limited local region and creates client calling number plans which can be system wide for a customer based telecommunication system utilizing a private telecommunication apparatus. The invention is independent of the configuration of the particular private telecommunications apparatus provided.

In the method of operating a telecommunication system according to the invention, each client is assigned a singular client identification number and for the several terminal device groups of the client respective access identification numbers ZID are provided. The communication system has client-individual call number plans which can expand the partly identical client terminal group call number plans by the access identification ZID.

The invention provides a dispatcher which determines the KID and ZID from an evaluation relevant part of the call number.

The method of configuring the telecommunication system can comprise the steps of:
  assigning a client identification number KID to each client;
  assigning an access identification ZID to a group of terminal devices;
  storing the evaluation-relevant parts of E.164 call numbers of subscribers connected to the telecommunication apparatus as required to determine ZID and KID and as dispatcher numbers; and
  associating the ZID and KID with the dispatcher numbers.
  Preferably access identifiers ZID are provided for each group of terminal devices.

The method of configuring can include the further highly advantageous step of forming a table which for KID/ZID combination indicates those which permit an internal traffic within the apparatus between the subscribers.

The dispatcher software for the telecommunication system can identify a client and a terminal device group based upon the client identification number KID and the access identifier ZID using dispatcher numbers stored in the telecommunication apparatus in the form of parts of E.164 call numbers of subscribers connected to the telecommunication apparatus and required to determine the KID and ZID based upon the call number determined by a call. These parts are called evaluation-relevant parts.

The telecommunication apparatus containing this dispatcher software will include this table and the information as to whether the communication is internal to the apparatus or over the public net, According to the invention addressing is based upon the conversion of singular public or private addresses into internal call numbers of client-individual call number plans whereby each of these call numbers is provided with the access identifier. The addressing method, therefore, allows optionally created call number plans to be used for the telephone communication apparatus at different locations in a single system which together provides a singular client-individual call number plan without requiring alteration of the call number plan of the locale.

With the singular correlation between the evaluation relevant parts of the call number and the KID, the telecommunications apparatus can establish each intended communication based upon whether client internal traffic is available. With a terminal device group to terminal device group routing table which has the routings for each combination KID/ZID for the subscribers of the terminal device groups, the telecommunication apparatus can determine whether a connection to an open network is required for each desired communication. In conjunction with this apparatus-internal traffic, resources exclusive to the apparatus can be employed.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
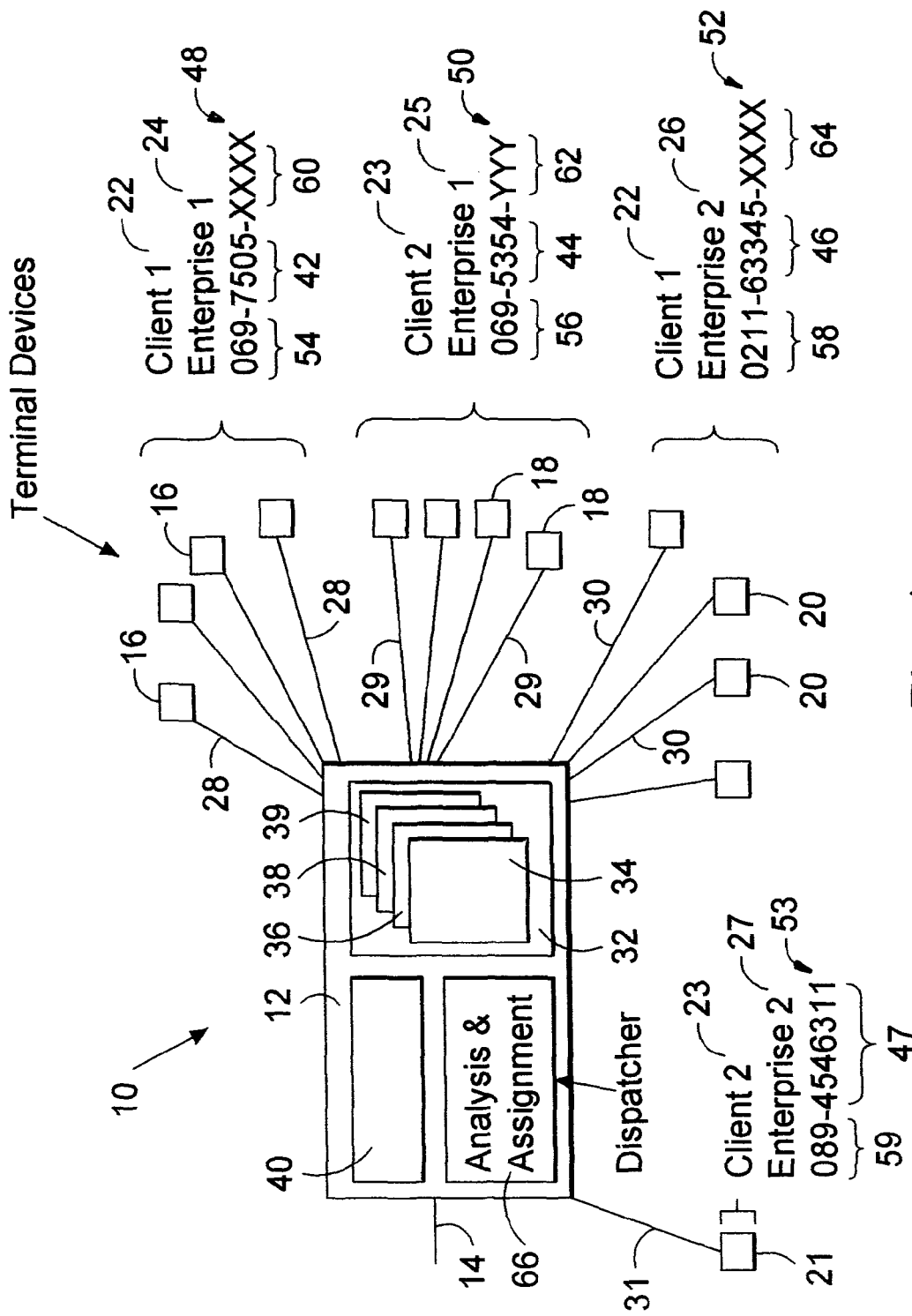
FIG. 1 is a schematic illustration of a communication system according to the invention.

FIG. 1 shows schematically a telecommunication system in accordance with the invention. The system represented as a whole at 10 comprises central communication equipment 12 with lines 14 connected to one or more open networks or nets. To the communications equipment 12, terminal devices 16, 18, 20, 21 are connected representing subscribers of different clients 22, 23. Client 22 has terminal devices of a number of enterprises, for example, the enterprises 24 and 26, respectively enterprises 1 and 2 of this client. The subscriber units or terminal devices 16 and 20 of client, represented collectively at 22, are connected via lines 28 and 30 to the communications equipment 12.

The second client, client 2 represented at 23, has terminal devices or subscriber units of the enterprises 25, 27 connected by lines 29 and 31 with the central communications equipment 12. The terminal devices 16, 18, 20, 21 can be optionally selected from any terminal devices which can operate in a telecommunications network like, for example, analog telephones, ISDN telephones, systems telephones, i.p. telephones, telefax devices, call answering machines, etc.

To administer the telecommunications system servicing completely independently clients 22, 23, the communications central equipment 12 has a device 32 making available to each client individually a respective calling number plan which can be independent of the calling number plan of any other client service with that communication system. For each client, the terminal devices may themselves be grouped with each group having a group call number plan which is independent of the other groups of the respective client but may be partly identical. The device 32 for providing the call number plans based upon a private telephone installation is designed to distinguish between the different clients and client groups and the data ranges assigned thereto, Because of the separation of the different data ranges, the device 32 for establishing the call number plans acts as a virtual private telephone installation 34, 36, 38, 39 for each of the enterprises 24, 25, 26, 27, respectively.

The terminal devices 16, 20, of the enterprises 24, 26 here form respective groups of subscribers of the client 22. Correspondingly, the terminal devices 18, 21 of the enterprises 25, 27 form respective groups of subscribers of the client 23. The clients or their groups use the communications system 10 independently from one another so that each client individually can freely select a client call number plan for that client containing partially identical terminal device group call number plans. The groups need not correspond to the particular enterprise although usually the enterprise is the best organizational unit for defining the subscribers of a particular group.

The central communication equipment 12 has, in addition, a device 40 for setting at least one access call number individual to the client and in accordance with the E.164 International Public Telecommunication numbering plan (also referred to as recommendation E.164 of the ITU) which provides the number structure and functionality for number used for international public telecommunication. The E.164 access call number one of the open network or one of the open networks which can be selected for that client. The choice is made by transmitting the specific E.164 call number. A call number 48, 50, 52 or 53 can serve in accordance with E.164 for international or world wide calling and can be comprised of an access call number of the client with respect to the open net and optionally an internal subscriber number 60, 62, 64.

The attribute "internal" means that this part of an E.164 call number is sufficient within a telecommunication installation to effect call direction.

The access call number as far as the open net is concerned is comprised of the call number of the client 42, 44, 46, 47 in the respective local net and optionally additional call numbers 54, 56, 58, 59 for the local net and optionally as well the country code of the client so as to have significance within the open net itself.

The Enterprise 2 of the client 2 is unique in that this client in its enterprise operates only with a single terminal device 21 and thus the call number of Enterprise 2 of client 2 is identical to the access call number with respect to the open net 59 and 47. In the Enterprise 2 of client 2 the corresponding group of terminal devices consists of only one terminal device. In this case there is no need to distinguish among several subscribers of the client for that enterprise. With groups of terminal devices for multiple subscribers as for Enterprises 1 and 2 of client 1 and Enterprise 1 of client 2, the subscribers are identified by the additional subscriber numbers 60, 64, 62.

On the one hand, a terminal device is then identifiable with its internal call number within a telecommunication central and on the other hand, because of the distribution of the telephone central into a number of virtual telecommunication centrals, the internal call number numbers may no longer be sufficient since a single internal call number may appl6 to a multiplicity of clients and a multiplicity of groups of subscribers. Thus in the telecommunication system each device is selected through a call number which corresponds to that allotted in the E.164 call number plan.

For example, both in enterprise 1 of client 1 and enterprise 2 of client 1 an internal client call number 4711. Enterprise 2 has the access code "63345" in the local net and enterprise 1 has the access code "7505". The telecommunication central has terminal devices from clients from Germany (International access code or country code "49") from a local network in Frankfurt (local net identifier "69" and from the local net of Dusseldorf (local.net identifier "211". Thus for the extension or substitution "4711" of enterprise 2 of the call number in the overall system will be $^{+}$49 69 63344 4711 and in enterprise 1, the number for the extension line in question will be $^{+}$49 69 7505 4711.

Thus it is possible in a single telecommunication central to determine the client association and the terminal group association singularly by a call number allowing based upon the configuration of the terminal device of the client also that access call number to be derived therefrom. A terminal device hardware configuration signifies that the access call number for this device or subscriber can be assigned by configuring the hardware. Each client of the telecommunication central has allotted to it an integer value in the configuration of the central equipment which is recognized as the client identification number KID and each terminal device or subscriber group has allotted thereto at the central equipment an access identification number ZID.

The communication equipment 12 has, in addition, a device 66 for analysis and assignment of call numbers, referred to herein as the dispatcher. This device 66 serves to supply the client identification number from a call number of an incoming call.

With the aid of FIGS. 2 and 3, the description below will indicate how the steps of the invention are carried out in handling communications within a multicorporate network. That multicorporate network has a singe telecommunications central 12 with the following characteristics:

The terminal device can be directly connected to the telecommunications central and for that purpose different access numbers are possible although a spatial limitation is possible.

The terminal devices can be switched over an access network using packet communications like for example ATM or ID. Further stretches can be included to the extent that direct communications are possible or extensions may be provided if indirect communications are acceptable.

One or more access lines are provided to the open network (PSTN).

The term "terminal device" is understood to include servers like for example telefax services and voice mail servers.

Initially an incoming call arrives based upon the call number transmitted by the calling party. Since a trunk line is used by different clients and a number of clients are serviced by a single trunk line, the incoming call must be first directed to the desired client. It is also for example necessary when the terminal device of a client has a call number which represents the same call number for another enterprise of that client to be able to distinguish among the terminal devices, For this purpose the access call number and the associated access identification must be used. For the extent that several clients utilize the same access code number apart or the complete internal number must be evaluated to determine the KID of the client the access call number is cancelled from the target number. Instead the singularity of the call number is obtained from two separate elements:

The client identification number KID and the access identification number ZID. The method steps are intended to make that possible.

To determine the access identification in operation, a comparison is made of the target call number obtained from the central office and the access call numbers obtained in a table of the telecommunications system. The coding of the target call number is here of special significance. It contains the element number plan identifier (NPI) which as a rule in the trunk line is always "ISDN", and the type of number (TON) if the TON is "international" that means that the country code is contained therein and thus the comparison in the table must start with the "country code" field. If the TON indicates "national", that means that no country code is contained in the calling number but only the city code and device codes are present. The comparison in the table thus utilizes the "city code" field. If the TON indicates "subscriber" then the comparison in the table takes place at the "device" field. If the obtained access identification is not singularly associated with a KID, to determine the KID a comparison of the remaining digits of the target call number with the compartment "internal call number" is carried out. If agreement is found the cable of the associated KID values supplies the particular KID. Then the internal call number, here the target call number from which the determined access call numbers has been removed, is provided with corresponding additional elements KID and ZID as stored in the communication-controlled data structure of the data base

TABLE 1

| Arriving Call Number Access Call Number | | | | | |
|---|---|---|---|---|---|
| Country | City Code | Device Code | Internal Call Number | KID | ZID |
| 49 | 211 | 5354 | . | 3 | 1 |
| 49 | 69 | 7505 | 47 | 2 | 2 |
| 49 | 69 | 7505 | 48 | 3 | 2 |
| 49 | 69 | 5354 | . | 3 | 3 |
| ... | ... | ... | ... | ... | ... |

Table 1 shows combinations of the incoming call number, KID and ZID in which the incoming call number is comprised of the access call number and the internal number and the access call number is comprised of country code, city code and equipment (central) code.

TABLE 2

| Public Call Number | | | | | | Internal Call Number | | | | |
|---|---|---|---|---|---|---|---|---|---|---|
| Digits | NPI | TON | KID | ZID | | Digits | NPI | TON | KID | ZID |
| 69-7505-4711 | ISDN | nat. | ... | ... | → | 4711 | ... | ... | 2 | 2 |
| 69-7505-48 | ISDN | nat. | ... | ... | → | 48 | ... | ... | 3 | 2 |
| 69-5354-4711 | | | | | → | 4711 | ... | ... | 3 | 3 |
| 211-5354-4711 | ISDN | nat. | ... | ... | → | 4711 | ... | ... | 3 | 1 |
| | | | | | → | | | | | |

Table 2 shows combinations of the public call number and the internal call number. The public call number is comprised of digits and possible signals corresponding to NPI and TON and has assigned to it a singular combination of KID and ZID. The internal call number is comprised of digits and possible NPI and TON signals and has assigned a singular combination of KID and ZID.

In these examples, the client with the KID 3 has two subscribers with the internal call number 4711, but in different enterprises.

All of the foregoing apply for each call number obtained over a line like for example the calling party number, connected number or performance specific call numbers.

The extensive signal content of the calling numbers at the lines is considered. The internal calling numbers in accordance with the method of the invention are as a rule only singular when they contain the elements KID and ZID, or at least ZID. Since these elements however only have meaning within a telecommunications apparatus, all of the call numbers with their extensive signalization and applied by lines two the telecommunication central or apparatus must be matched thereto if they are to have a singular result in connecting the receiving device or terminal. The lines can be connected to further communications apparatus, for example a central office and other terminal devices for example telephone terminals, telefax devices and servers.

This makes a number of variants conceivable. The internal call number is known via the communications device connected to the line or a terminal device connected thereto so that the additional elements can be omitted.

In another variant the internal call number of the communications device connected to the line or the terminal device connected to the line may be unknown or not singular (definitive) and the significance thereof can only be made meaningful by the conversion of the additional element ZID into an access number for the internal call number based upon the private call number plan (see ISO/IEC 11571) with corresponding additional elements such as a numbering plan identifier NPI or private –NP, and TON (Type Of Number=Level 2, Level 1, Local or Unknown).

In a further variant, the internal call number for the communications device connected to the line or the terminal device connectable over the line is either unknown or not significant and can be made significant only with conversion of the additional element—ZID into an access number preceding the internal call number and derived from a public call number plan (CITU-T recommendation E 164) with corresponding additional elements NPI (Number plan identifier=ISDN-NF) and TON (Type of number equals international), national, subscriber or unknown)

As has already been suggested above and can be deduced from the examples of Table 1, a specific access identification can be converted to a singular access number. The conversion for Table 2 has been shown in Table 3.

TABLE 3

| Internal Call Number | | | | | | Public Call Number | | | | |
|---|---|---|---|---|---|---|---|---|---|---|
| Digits | NPI | TON | KID | ZI | → | Digits | NPI | TON | KID | ZI |
| 4711 | ... | ... | 2 | 2 | → | 69-7505-4711 | ISDN | nat. | ... | ... |
| 48 | ... | ... | 3 | 2 | → | 69-7505-48 | ISDN | nat. | ... | ... |
| 4711 | ... | ... | 3 | 3 | → | 69-5354-4711 | ISDN | nat. | ... | ... |
| 4711 | ... | ... | 3 | 1 | → | 211-5354-4711 | ISDN | nat. | ... | ... |

If traffic between enterprises of a client is considered there may not be any overlap in the call number plans of the enterprises. If a client has an internal call number plant which is singular with respect to all enterprises, it is then sufficient to select the terminal device of an enterprise through the internal call number of the terminal device from another enterprise to reach that terminal device. Even when the call number of the calling device is displayed at the called device it is sufficient to indicate only the internal call number since this provides the singular information, i.e. the information exclusively identifying the calling device. If a terminal device of a client selects an internal call number, this can be automatically completed with the KID of the called terminal device. From the internal call number and the KID, the ZID can also be singularly determined.

The selection and indication of all numbers spanning the enterprises can be effected over the public or private number plan. For this purpose the method can use the approach for overlapping internal calling number plans (see below).

The traffic between enterprises of a client in the case of an overlapping of the calling number plans of the enterprise now be described. An overlapping of the calling number plans of different enterprises of a particular client results in the fact that the internal calling numbers spanning the enterprises are no longer singular, meaning that they must be completed by a public or private access number to singularly define a particular terminal device. If a terminal device of a client calls an internal call number, this internal call number is automatically completed with the KID and the ZID of the called terminal device, i.e. It is a starting point that the terminal device which is to be reached is another terminal device of the same client in the same enterprise.

Should the terminal device reach another terminal device of the same client in another enterprise, the calling terminal device must select the access calling number (public or private) of the target enterprise. The telecommunications apparatus seeks to enable the KID and ZID by the aforedescribed method. To the extent that this is possible (the target terminal device is connected to the telecommunications apparatus) the targeted call number is again an internal call number with KID and ZID. With this an internal standard connection can be made.

If the KID and ZID of the cal number of a called terminal device coincides with the KID and ZID of this called device, only the internal call number is displayed. Otherwise the call number is completed by the method described.

Figure 2:
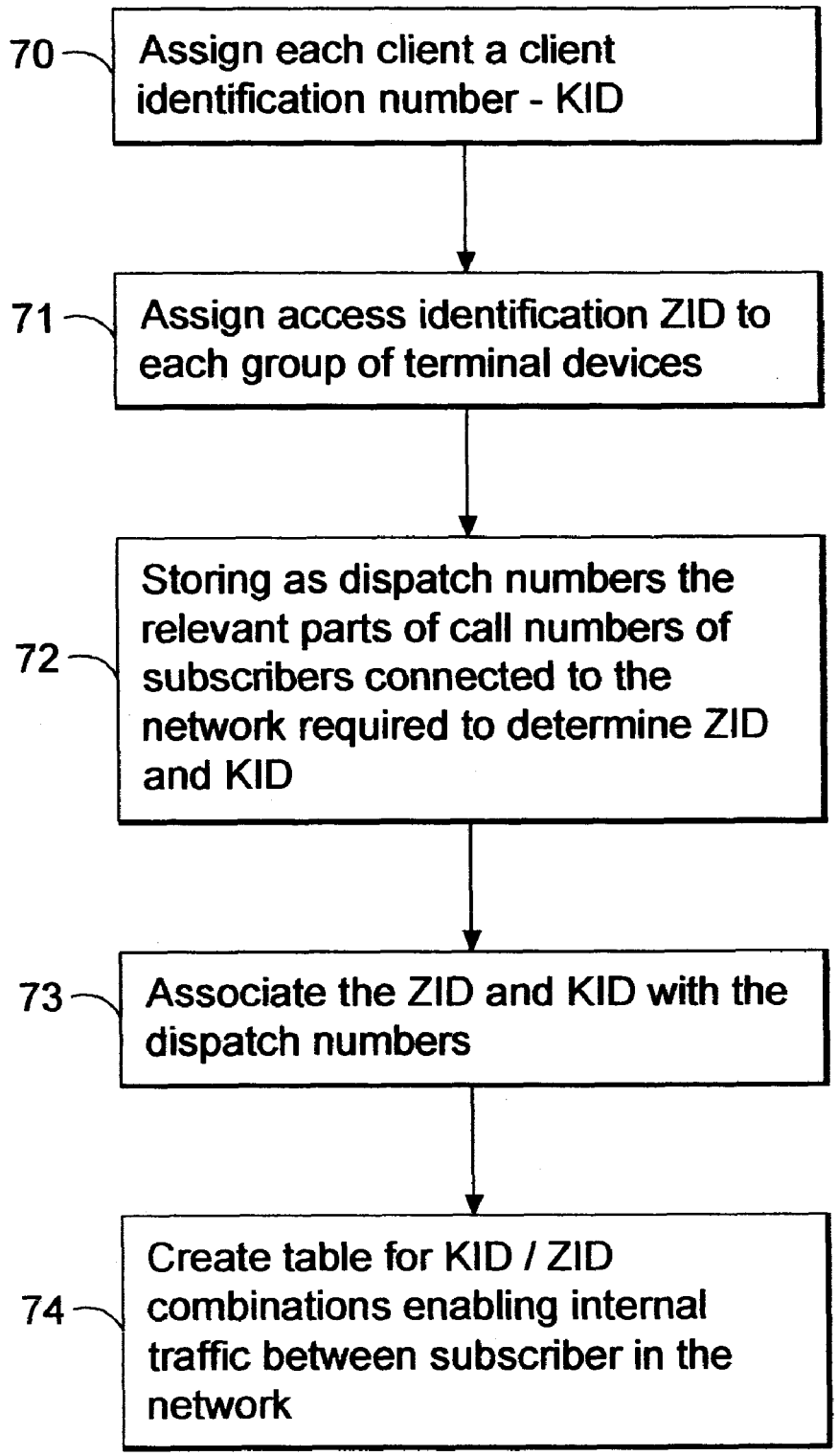
FIG. 2 is an information flow diagram of a method of configuring a telecommunication system according to the invention.

FIG. 2 is a flow diagram of the method of the invention for configuring a telecommunication system which has a plurality of independent clients, each of which has a plurality of terminal devices connected to the communication system and capable of being used independently from one another, whereby the configuration is embodied in an apparatus of the system visually referred to herein as the central equipment or, in some cases, the "central" itself. In method step 70, each client is assigned a client identification number KID. In method step 71, an access identification number ZID is assigned to each group of terminal devices. In step 72 of the method, the evaluation-relevant parts of an E.164 call number of the subscribers connected to the apparatus or central and which are required for determining the ZID and KID are stored as dispatcher numbers. In method step 73, the ZID and KID are associated with the dispatcher numbers. Advantageously, in accordance with the invention, in a further step 74, a table is created which for each KID/ZID combination, indicating which of these combinations will enable internal traffic between subscribers in the network (and possibly which combinations will not permit internal traffic within the apparatus or central).

In the method of operating a telecommunication system of the invention which has a plurality of independent clients, each of which has a plurality of terminal devices connected to the communication system and capable of use independently from one another, each of the clients has a respective client identification KID assigned to it and individual to that client. The terminal devices of each client are grouped and each group provided with a singular access identifier ZID and the communication system is provided with call number plans individual to the respective client with which partly identical client terminal device group call number plans can be enlarged or augmented by the access identifier. Preferably the dispatcher can thereby enable a KID and ZID from evaluation relevant parts of a call number.

Figure 3:
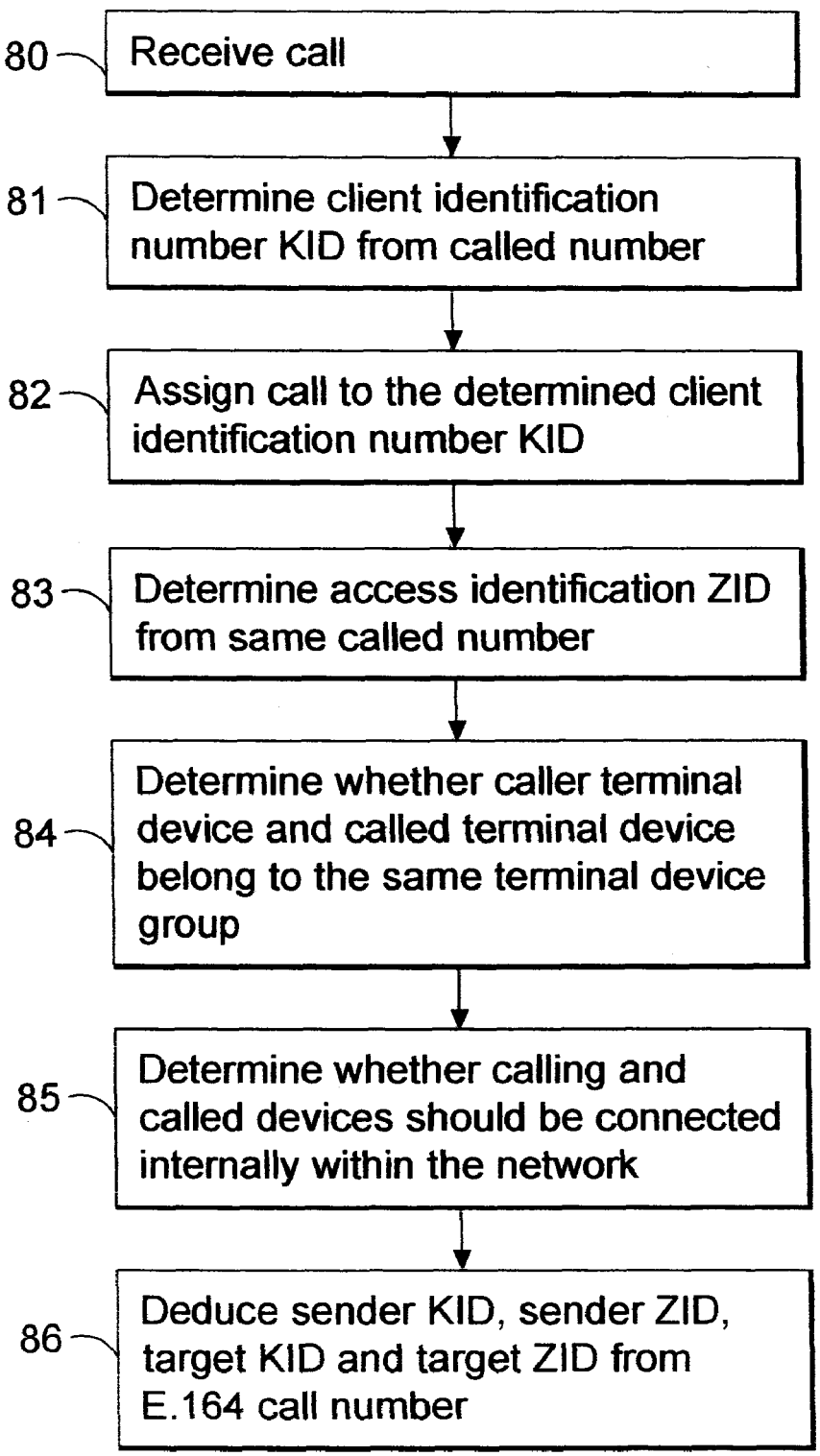
FIG. 3 is a flow diagram of a method of operating a telecommunication system according to the invention.

FIG. 3 is a flow diagram of the method of the invention for operating the telecommunication system. In method step 80, a call is received. In step 81 a determination is made, based upon the called number of the client identification number KID. In step 82 the client identification number KID determined from the called number is assigned to the particular client. In step 83 the access identification ZID is determined from the same call number. In accordance with a feature of the invention which has been found to be particularly advantageous, in a further step 84 a determination is made as to whether the calling terminal device and the called terminal device belong to the same group of terminal devices. In step 85, advantageously, a determination is made as to whether the calling and called devices should be connected internally within the system by the central equipment or apparatus thereof.

In the last step 86 shown in FIG. 3, the sender KID and ZID and the target KID and ZID are determined from the E.164 call number or the evaluation relevant part thereof of the target terminal device. Advantageously, the determination of the KID is effected with the aid of dispatcher numbers stored in the telecommunication equipment or central, namely as such parts of the E.164 call number of the subscriber connected to the telecommunication system which establishes singularly the KID and ZID thereof from parts of the calling number.

According to a feature of the invention, traffic which extends beyond a group of terminal devices but is nevertheless internal to the central apparatus of the system is charged at rates individual to the terminal device group. Terminal device group internal traffic can also be charged at rates individual to the group.

The telecommunication system advantageously comprises private telecommunication equipment or centrals and a telecommunication equipment participating in a call can determine both the KID and ZID for communications which go outside the terminal groups and are thus not internal to the apparatus, both of the caller and the called.

Dispatcher software according to the invention, which is provided in one or more computers forming the apparatus in a telecommunication system having a plurality of independent clients each with a plurality of terminal devices connected to the communication system and which are provided in terminal device groups and can be used independently from one another, serves to identify a client and a terminal device group based upon a client identification number KID assigned to the client and an access identification ZID assigned to the group, whereby the identification of client and terminal device group is carried out with the aid of dispatcher numbers stored in such apparatus, namely in the form of parts of E.164 call numbers of subscribers connected to the apparatus which determine the KID and ZID based upon the call number of each call.

The telecommunication apparatus has such dispatcher software and can include preferably for each combination KID/ZID of calling and called subscribers a table with the information as to whether the corresponding communication should be effected as internal communication, i.e. within the apparatus, or over the open net.

A plurality of clients can use each such customer based telecommunication apparatus with a multiplicity of terminal devices which can be used independently of one another in which the terminal devices of each client are grouped as described and each group of the clients terminal devices can have an access identification assigned exclusively to it. The individual groups of terminal devices can either belong to distinct enterprises and/or organizational units of a client or the client itself can be a service provider whereby the groups of terminal devices can correspond to the terminal devices of clients or customers of the service provider. The telecommunication apparatus, through means for storing the client identification numbers of all participating clients and access identification numbers of all terminal groups can thereby service the entire local system which can, through that equipment be connected to a public network. The client identification number and access identification number are determined, as noted, from the E.164 call numbers of the terminal devices or from evaluation-relevant parts thereof. These customer-based extension apparatuses or centrals are advantageously call number plans which are individual to the client and which for each client can provide a call number plan specific to each terminal device group so that a particular extension number in the customers telecommunication apparatus can be used a number of times, each once for a particular terminal device group of a particular client. Connection between the terminal devices can however extend beyond the boundaries of the client's system, can be wholly within the particular extension apparatus or can be transmitted through the open net.

We claim:

1. A method of configuring a telecommunications system serving a plurality of mutually independent customers each having a plurality of terminals connected to the telecommunications system, the method comprising the following steps automatically effected in telecommunications equipment of the telecommunications system:
    assigning a customer identification to each of the customers;
    forming the terminals of at least one customer into a plurality of terminal groups each having at least one of the terminals of the respective customer and assigning each of the groups an unambiguous access-identification terminal-group identification;
    storing in a writable media as dispatch numbers evaluation-relevant parts of E.164 call numbers of all subscribers connected to the telecommunications system required to determine the terminal-group identification and customer identification thereof; and
    assigning the terminal-group identifications and customer identifications to the dispatch numbers.

2. The method defined in claim 1, further comprising the step of:
    creating a table showing for each value of a combination of a customer identification with a terminal-group identification whether internal traffic between subscribers within the telecommunications system is permissible.

3. The method defined in claim 1, further comprising the step of
    determining at a dispatcher a respective customer identification and a respective terminal-group identification from evaluation-relevant parts of a call number.

4. The method defined in claim 3, further comprising the steps of:
    receiving a call;
    determining a customer identification from a called number from the received call;
    assigning the call to the determined customer identification; and
    determining a respective access identification from the same called number.

5. The method defined in claim 4, further comprising the step of
    determining whether the called terminal and a terminal initiating the call belong to the same terminal group.

6. The method defined in claim 4, further comprising the step of
    determining whether communication should be established between the called terminal and the calling terminal internally within the telecommunications system.

7. The method defined in claim 4, further comprising the step of
    deriving a sender customer identification and a sender terminal-group identification from an E.14 call number of the sender, and a target customer identification and a target terminal-group identification from an E.14 call number of a targeted terminal.

8. The method defined in claim 7 wherein the determination of the customer identification is effected with the aid of dispatcher numbers stored in telecommunications equipment of the telecommunications system in the form of such parts of E.314 call numbers of subscribers connected to the telecommunications system that yield the customer identification and terminal-group identification assigned to the subscriber and based upon parts of a call number obtained for the call.

9. The method defined in claim 4 wherein telecommunications traffic over boundaries of a terminal group is charged at a rate individual to that terminal group.

10. The method defined in claim 4 wherein telecommunications traffic within a terminal group is charged at a rate individual to that terminal group.

11. The method defined in claim 4 wherein the telecommunications system has telecommunications equipment enabling the calling of an associated telecommunications apparatus for noninternal traffic beyond boundaries of a terminal group, and wherein both the customer identification and terminal-group identification of caller and called terminals are determined.

12. Dispatcher software recorded on a writable media for use in a telecommunications system and programming at least one computer forming part of telecommunications equipment in the system usable by a plurality of mutually independent customers each having a plurality of terminals connected to the telecommunications system and wherein the terminals of at least one customer are formed in a plurality of terminal groups, the software being configured to identify each customer and each terminal group by a customer identification assigned to the customer and an access-identification terminal-group identification assigned to each terminal group to identify the customer and the terminal group with the aid of dispatch numbers of all customers and the respective terminals stored in the telecommunications equipment utilizing an E.164 call number transmitted with a call, with the dispatch number being those parts of the E.164 call numbers necessary for determination of the customer identification and group identification, the dispatch numbers being assigned to the terminal-group identifications and customer identifications.

* * * * *